Aug. 15, 1967  L. L. MILLER  3,335,864
PRESSURE ACTUATED FILTER
Filed Sept. 8, 1964  3 Sheets-Sheet 2

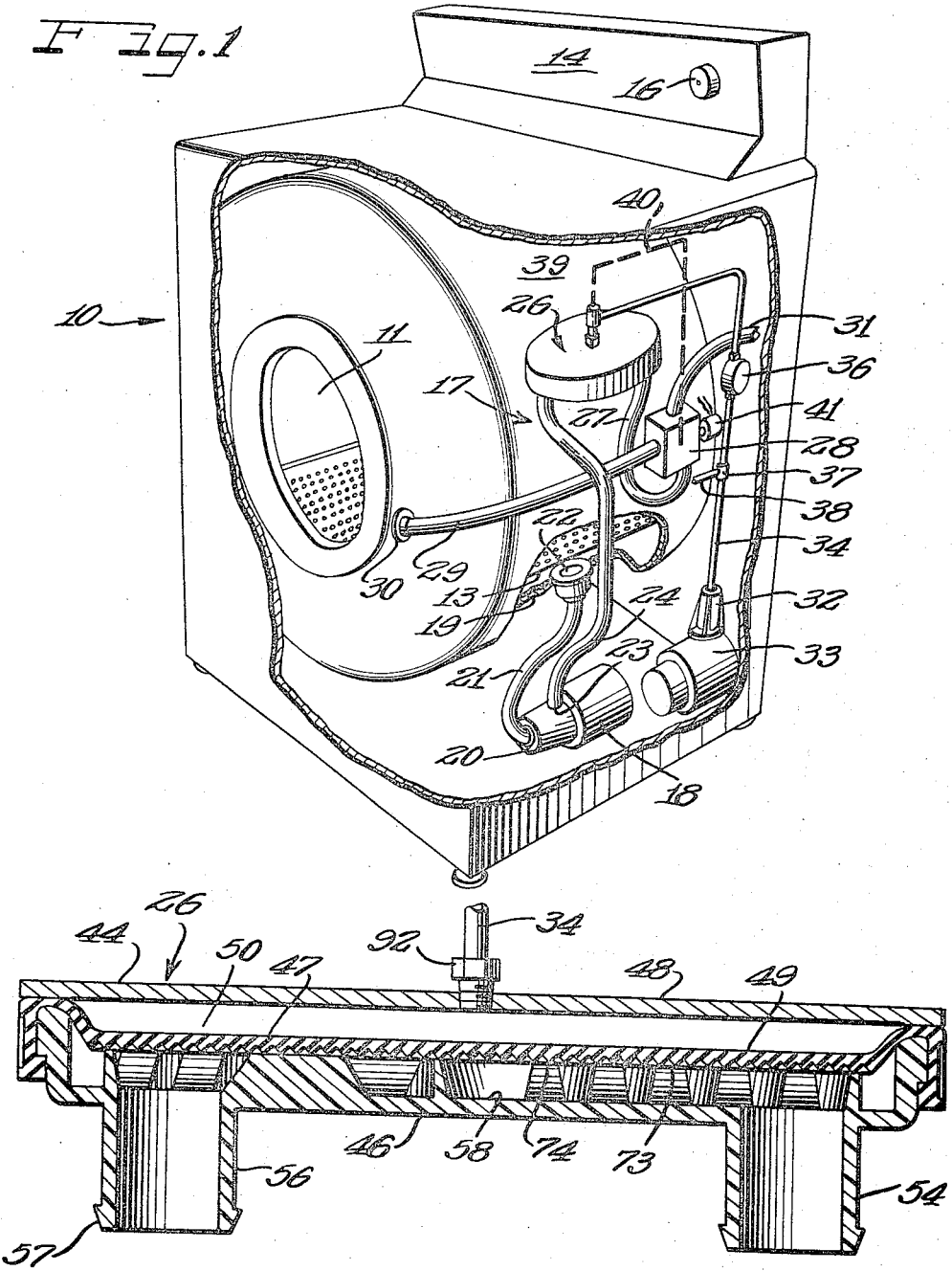

INVENTOR.
Lewis L. Miller
BY Hill, Sherman, Meroni, Gross & Simpson  ATTORNEYS

Aug. 15, 1967 L. L. MILLER 3,335,864
PRESSURE ACTUATED FILTER
Filed Sept. 8, 1964 3 Sheets-Sheet 3
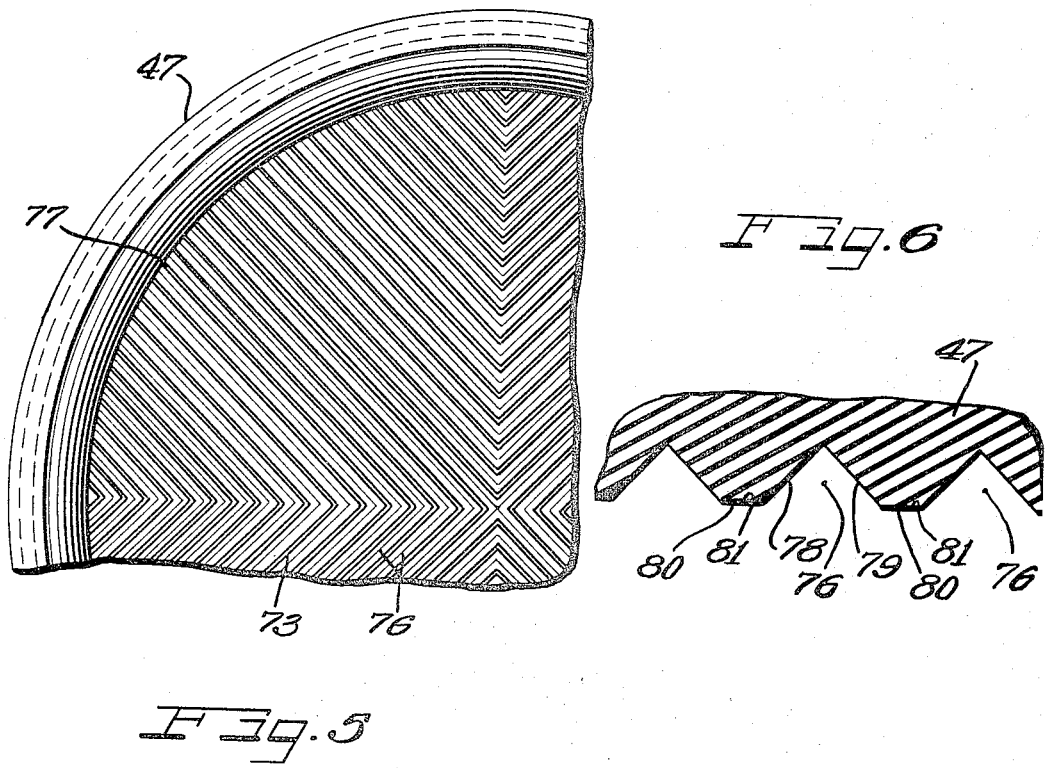
Fig.6
Fig.5
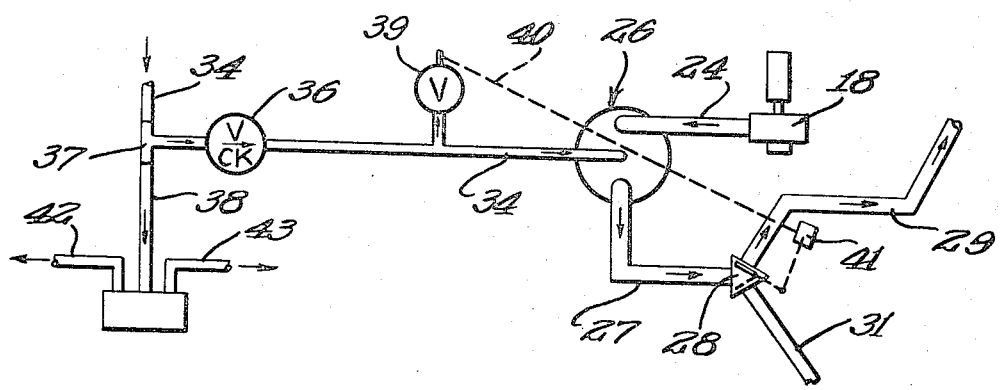
Fig.7
INVENTOR.
Lewis L. Miller
BY ATTORNEYS

United States Patent Office 3,335,864
Patented Aug. 15, 1967

3,335,864
PRESSURE ACTUATED FILTER
Lewis L. Miller, Benton Harbor, Mich., assignor to Whirlpool Corporation, Benton Harbor, Mich., a corporation of Delaware
Filed Sept. 8, 1964, Ser. No. 394,728
9 Claims. (Cl. 210—108)

ABSTRACT OF THE DISCLOSURE

A self-cleaning, pneumatically actuated maze filter for use in the hydraulic circuitry of a laundry appliance. During recirculation of laundry liquid, air pressure biases a ribbed, flexible diaphragm against a cooperative ribbed member to form a maze filter. During drain, the air pressure is released allowing the flexible diaphragm to separate from the ribbed member and the filter is flushed clean.

It is an object of the present invention to provide a unidirectional filter which can be effectively flushed selectively by the carrier streams flowing therethrough.

Another object of the invention is to provide a filter having a member which is movable in response to liquid being circulated through the filter to selectively form a filter maze to accommodate flushing and cleaning flow.

Another object of the present invention is to provide pneumatically actuated filter for a washing machine wherein a pressure responsive member operates to engage irregularly shaped filtering surfaces for forming small orifices therebetween to remove foreign particles from laundry liquid circulated therethrough during a washing operation and which operates to disengage said filtering surfaces during a draining operation to eliminate the orifices and to provide for cleaning of the surfaces by the laundry liquid.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative examples only.

In the drawings:

FIGURE 1 is a perspective view of an exemplary automatic washing machine constructed in accordance with the principles of the present invention with portions thereof cut away to show the relative disposition of parts;

FIGURE 2 is a sectional side view of a pneumatically actuated filter of the invention;

FIGURE 5 is a fragmentary bottom plan view of a flexible wall member or diaphragm of the filter;

FIGURE 6 is an enlarged fragmentary cross-sectional view of the diaphragm of FIGURE 5 illustrating the configuration of the lands and grooves formed on the inner face thereof; and FIGURE 7 is a plumbing diagram of the hydraulic circuitry of the washing machine of FIGURE 1 incorporating the principles of the present invention.

As shown in the drawings:

Figure 3:
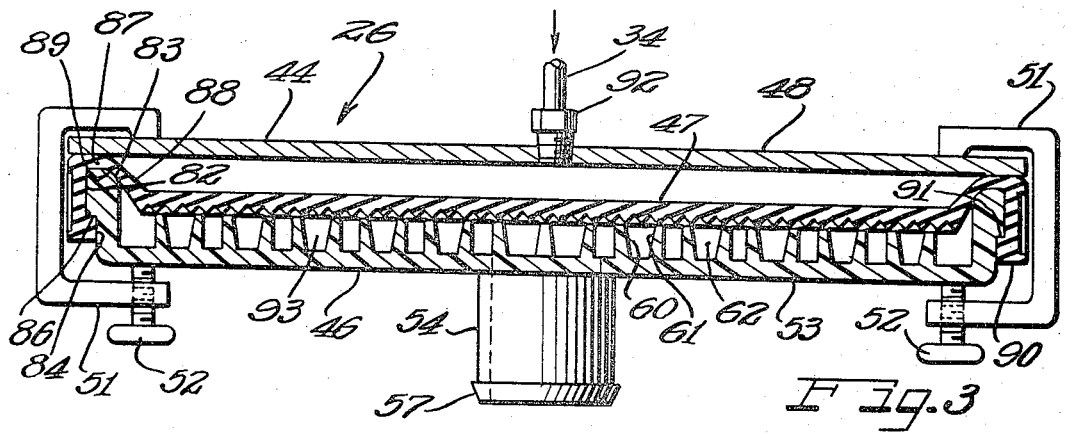
FIGURE 3 is a sectional side view through another portion of the pneumatic filter of FIGURE 2.

Although the principles of the present invention are of general utility, a particularly useful application is made to automatic washing machines and an illustrative embodiment herein shown consists of a rotating drum-type automatic washing machine shown generally at 10 having a treatment zone 11 comprising an imperforate tub 12 and a perforate horizontally disposed rotatably mounted wash basket or drum positioned therein as at 13. Although a rotating drum type washer is shown it will be understood that the principles of the present invention are applicable to a washing machine incorporating other types of washing mechanisms, such as horizontally disposed drums, and also find utility in filtering liquids in any other apparatus incorporating a circulating hydraulic fluid.

The machine 10 is of the type which operates automatically and sequentially through a complete presettable programmed laundering cycle including a washing operation, an extracting operation and a draining operation. In order to control the operation of the machine through such a cycle a control circuit is housed within a control cabinet 14 and incorporates a presettable sequential control means having control knob 16 for manually selectively setting the control circuit to provide the desired wash cycle.

The embodiment of the machine 10 illustrated in FIGURE 1 comprises a hydraulic circuit formed by conduit means and componenets associated therewith indicated generally at reference numeral 17 for recirculating laundry liquid confined within the treatment zone 11 from the treatment zone through the hydraulic circuit and back to the treatment zone during a washing operation, and for discharging the laundry liquid from the machine during extracting and draining operations.

The hydraulic circuit 17 is more particularly characterized as comprising a laundry liquid pump 18 which is disposed below a bottom wall 19 of the tub 12 and which is connected at an inlet 20 thereof to a conduit 21 communicating the inlet 20 with a sump 22 mounted in the bottom wall 19 of the tub 12.

The pump 18 is connected at an outlet 23 thereof to a conduit 24 which connects the outlet 23 to a filter 26. The filter 26 is constructed in accordance with the principles of the present invention and is suitable for removing and entrapping lint, dirt, grit and other impurities and foreign particles which are entrained in the laundry liquid.

From the filter 26, the laundry liquid is circulated through a conduit 27 to a solenoid-operated flow valve 28. The valve 28 is operative to direct the laundry liquid selectively and alternatively through a conduit 29 and a nozzle 30, from which the laundry liquid is discharged back into the treatment zone 11, or through a conduit 31 which directs laundry liquid from the machine 10 to suitable waste disposal means such as a drain line.

The filter 26 is adapted to alternatively remove foreign particles from the laundry liquid being circulated therethrough, and then to release such foreign particles back into the laundry liquid and to be cleaned and flushed by the laundry liquid being returned through the filter to a drain.

In order to actuate the filter 26 in the performance of these two alternative functions, the filter includes a pressure-responsive actuating member which forms one wall of a pressure chamber 50 connected to a source of pressurized fluid such as an air compressor 32 mounted in the machine 10 and driven by suitable means such as an electric motor 33.

The compressor 32 is pneumatically connected to the filter 26 by means of a conduit 34 having mounted therein a check valve 36 enabling the compressed air to flow only from the compressor 32 to the filter 26 thus preventing the loss of pressure in pressure chamber 50 in the event of a momentary interruption of pressure during washing operation. Without the check valve 36, any interruption in the pressure would permit the release of the entrapped foreign particles into the circulating stream. A T-connector 37 is mounted in the conduit 34 between the check valve 36 and the compressor 32 for connecting to a conduit 38 which may be utilized for supplying compressed air to other pneumatically actuated mechanisms incorporated within the machine 10, such as, for example, a pneumatically-actuated clutch-transmission drive assembly or a pneumatically-actuated drum balancing system for dynamically balancing the drum or basket 13 and a load of wash material confined therein when the drum is rotated at relatively high speeds during an extracting or a draining operation.

In order to selectively reduce the control fluid pressure within the filter 26, a bleed valve 39 is mounted in the conduit 34 adjacent the filter. The valve 39 is operated by means of a suitable linkage mechanism indicated schematically by a broken line at reference numeral 40 which is connected to and is actuated by the solenoid-operated flow valve 28.

Referring to FIGURES 1 and 7, during a washing operation of the machine 10 the flow valve 28 is positioned by means of a solenoid 41 to direct the laundry liquid being circulated therethrough from the conduit 27 to the conduit 29, and simultaneously closing off the conduit 31. Accordingly, the laundry liquid is circulated from the sump 22, through the pump 18 and the filter 26, through the valve 28 and the conduit 29 back to the treatment zone 11.

Simultaneously during a washing operation, the solenoid 41 is effective to operate the bleed valve 39 such that compressed air supplied to the filter 26 through the conduit 34 will be confined within and will pressurize and actuate the filter to remove foreign particles from the laundry liquid being circulated therethrough.

During an extracting and draining operation, the solenoid 41 actuates the valve 28 to close the conduit 29 and to direct the laundry liquid from the conduit 27 to the conduit 31, thereby discharging the laundry liquid from the machine to a suitable drain.

Simultaneously, the solenoid 41 operates the bleed valve 39 through the linkage mechanism 40 to exhaust the compressed air within the filter 26, whereby the filter is cleaned and flushed by the flow of laundry liquid being circulated therethrough.

It will be appreciated that the laundry liquid is circulated in one direction through the filter 26 during filtering and flushing.

In addition, it will be noted that a pair of conduits 42 and 43 may be connected to the air line 38 for communicating the source of compressed air to other pneumatically-actuated mechanisms which may be incorporated in the machine 10.

Figure 4:
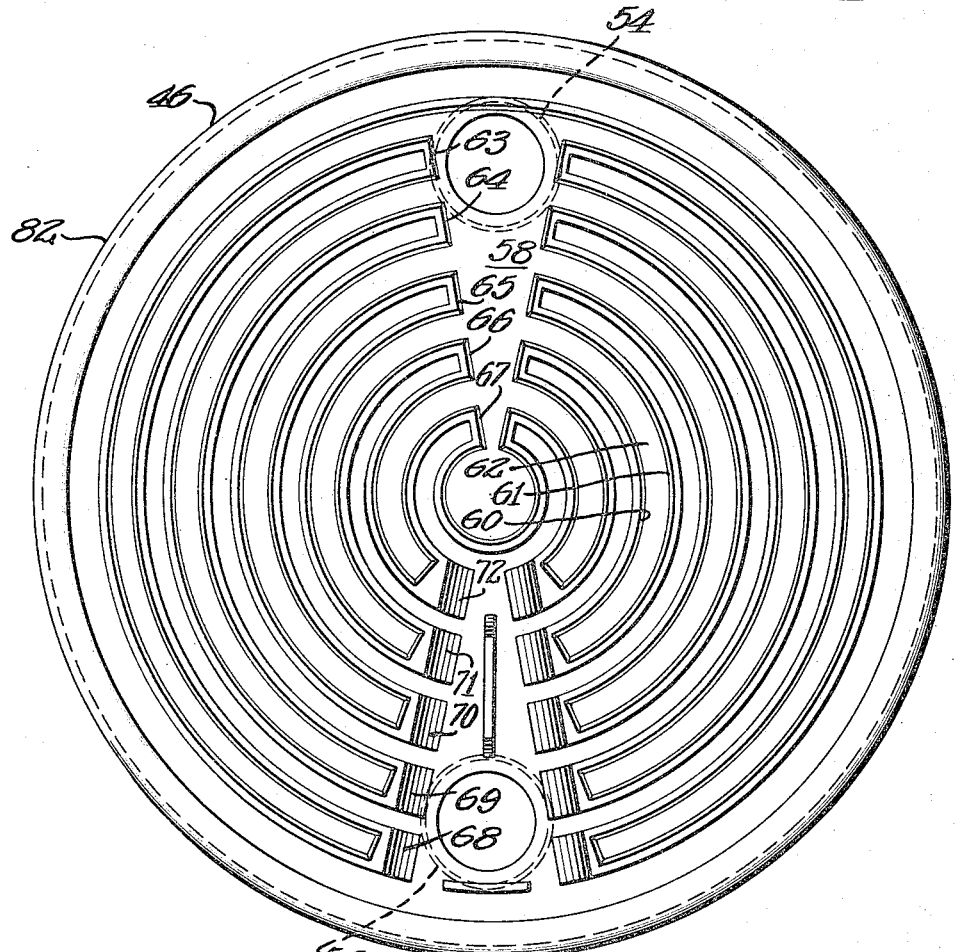
FIGURE 4 is a top plan view of the filter body of the filter illustrated in FIGURES 2 and 3.

Referring to FIGURES 2–6, the filter 26 comprises a shallow or flat annularly shaped housing 44 having one end wall which comprises a lower member or filter body portion 46 and a second end wall which comprises an upper member or filter body portion 46 and a second end wall which comprises an upper member or resilient diaphragm 47. In the embodiment illustrated, the body portion 46 constitutes a rigid, non-resilient member made of material such as plastic or the like. The diaphragm 47 constitutes a flexible, elastic material, such as rubber, which is capable of a flexing or bellowing action when acted upon by the various hydraulic pressures to which the filter is subjected during a wash cycle.

A pressure plate 48 spans a flat face 49 of the diaphragm 47 to form a pressure chamber 50 therebetween, and in order to maintain the pressure plate 48, the diaphragm 47 and the body portion 46 in fixed assembly, a plurality of C-shaped clamps 51 are spaced about the periphery of the filter 26 and include, respectively, a thumbscrew 52 for securely clamping the members together.

Extending downwardly from an outer face 53 of the filter body 46 are a pair of spaced, cylindrically shaped duct members 54 and 56 for connecting, respectively, to the conduits 24 and 27 (FIGURES 1 and 7) for directing laundry liquid into and out of the filter 26. The duct members 54 and 56 are provided with an enlarged head portion as at 57 to provide a good connection with the corresponding conduits, but of course hose clamps or other suitable means may be used to effect a clamping action of the conduits or hoses to the ducts if desired.

The filter body 46 comprises a flat inner face 58 having formed thereon projecting outwardly therefrom a plurality of arcuately shaped radially spaced liquid deflectors or rib members 59. Each of the rib members 59 comprises a pair of radially spaced complementarily shaped side walls 60 and 61 such that adjacent rib members form arcuately shaped channels or grooves as at 62.

In order to form a tortuous filter path which will separate impurities and foreign particles from the liquid stream, a series of baffle members or transverse walls are formed on the inner face 58 of the filter body 46 and are arranged to interconnect adjacent wall members 60 and 61 at alternate ends of the adjacent channels or grooves 62. For example, transverse walls 63–67 are illustrated as interconnecting, respectively, a pair of adjacent wall members 60 and 61 near the inlet duct connector 54. The transverse walls 63–67 are arranged such that alternately spaced channels are in open communication with the inlet 54, thereby serving as entrance walls.

Another series of transverse wall members 68–72 are arranged to interconnect other pairs of wall members 60 and 61 near the outlet duct connector 56. The transverse walls 68–72, which may be defined as exit walls, do not interconnect any pair of side walls 60 and 61 that are interconnected by the transverse walls 63–67.

The exit walls 68–72 prevent direct flow to the outlet 56, from any of the channels 62 which are in communication with the inlet 54, and the entrance walls 63–66 prevent communication with the outlet 56 of any channels in communication with the inlet 54.

The circularly shaped diaphragm 47 comprises a serrated face 73 which is engageable in abutting relation with upper edge 74 of the wall members 60 and 61. All of the upper edges 74 lie in a single plane which is disposed in parallel relation to the inner face 58 of the filter body 46.

A fragmentary plan view of the inner face 73 of the diaphragm 47 is illustrated in FIGURE 5 and is shown as comprising a series of serrations or grooves 76 which are grouped essentially into four quadrants of the diaphragm. All of the grooves 76 in each of the four quadrants are arranged in spaced parallel relation, and each extends from one of four radii of the inner face 73 which are angularly spaced by 90°, and extend radially to a perimeter 77 of the inner face 73.

As shown in FIGURE 6, each of the grooves 76 comprises a pair of converging groove walls 78 and 79 which intersect each other substantially at right angles. The grooves are separated from adjacent grooves by a pair of spaced parallel lands 80 which comprise a flat bottom wall as at 81. When the filter 26 is arranged to remove foreign particles from the liquid being circulated therethrough, the bottom walls 81 and the edges 74 of the wall members 60 and 61 are arranged in abutting relation.

The filter body 46 comprises an upstanding circumferentially continuous peripheral wall 82 having an arcuately shaped upper surface 83 and a recessed portion 84 forming an outturned shoulder 86.

In order to securely mount the diaphragm 47 on the filter body 46, the diaphragm is characterized by a peripheral flange portion 87 having an outwardly angularly arcuately shaped transition portion 88 which extends upwardly to and overlies the upper surface 83 of the filter body 46. An inner face 89 of the transition portion 88 is shaped complementarily to the peripheral wall 83 and comprises an annularly shaped boss 90 having an inturned shoulder 91 in abutting engagement with the shoulder 86 of the peripheral wall 82.

To mount the diaphragm 47 on the filter body 46, the flange portion 87 of the diaphragm is urged outwardly over and around the peripheral wall 82 and downwardly thereon until the boss 90 is positioned adjacent the recessed portion 84, and "snaps" the shoulder 91 into contiguous abutting engagement with the shoulder portion 86.

In order to pressurize the chamber 50 between the pressure plate 48 and the diaphragm 47, a fitting 92 is mounted in the pressure plate 48 for receiving the compressed air line 34.

It will be appreciated that the diaphragm 47 effectively separates or partitions the interior of the filter housing 44 into a pair of chambers, namely, the pressure control chamber 50 which is formed between the pressure plate 48 and the diaphragm 47, and a filtering chamber 93 which is formed between the diaphragm 47 and the inner face 58 of the filter body 46.

During a washing operation, when the laundry liquid is recirculated from the treatment zone 11 through the hydraulic circuit 17 and back to the treatment zone 11, the solenoid 41 operates to close the bleed valve 39 whereby the pressure chamber 50 in the filter 26 is pressurized. Since the diaphragm 47 forms one wall of the chamber 50 and provides a motive surface, the pressure in the chamber 50 is sufficient to maintain the serrated face 73 of the diaphragm 47 in abutting engagement with the edges 74 of the wall members 60 and 61 in opposition to the pressure of the liquid in the filtering chamber 93. The liquid, in order to circulate from the filter inlet 54 to the outlet 56 must pass between adjacent channels 62 through the grooves 76 formed in the diaphragm inner face 73. It will be appreciated that foreign particles such as lint, dirt, grit and the like will be trapped in the fine grooves 76 and removed from the liquid.

During an extracting and a draining operation, the solenoid 41 operates to position the valve 28 such that the liquid is removed from the machine 10 through conduit 31, and also operates the bleed valve 39 to release or exhaust the compressed air in the compressor chamber 50. As a result, the pressure of the liquid in the filtering chamber 93 is sufficient to urge the diaphragm 47 away from the wall members 60 and 61, thereby eliminating the orifices formed by the fine grooves 76 and releasing the entrapped foreign particles back into the liquid being circulated through the filter. In addition, as a result of the irregularities in the confronting surfaces of the diaphragm 47 and the filter body 46, a high degree of turbulence is created within the filter chamber 93 whereby the liquid cleanses and flushes such confronting surfaces and the entire filter chamber 93.

Although minor modifications might be suggested by those versed in the art, it should be understood that I wish to embody within the scope of the patent warranted herein all such modifications as reasonably come within the scope of my contribution to the arts.

The embodiments of the invention in which an exclusive property or privilege is claimed are defined as follows:

1. In cleaning apparatus,
   means forming a hydraulic circuit including a treatment zone,
   a pump in said circuit for driving a stream of liquid from the treatment zone through the circuit unidirectionally, and
   a filter connected in said circuit on the discharge side of said pump,
      said filter having a housing and a movable flexible wall member partitioning the interior of said housing into a pressure chamber and a filter chamber,
         said flexible wall member forming a motive surface of said pressure chamber on one side thereof and forming together with said filter chamber a filter maze on the other side thereof when in a filtering position,
      said flexible wall member being actuatable between a filtering position and a flushing position so the filter may be selectively flushed upon pressure controlled movement of said movable member.

2. In cleaning apparatus,
   means forming a hydraulic circuit including a treatment zone and a pump for circulating liquid through the circuit unidirectionally,
   a fluid pressure actuated filter connected in said circuit to remove foreign particles from the liquid,
      said filter comprising a filter chamber and a fluid pressure chamber having a common movable wall,
      one surface of said movable wall being movable and engageable with respect to the opposite wall of said filter chamber and forming when engaged therewith a filter maze through which the liquid passes, the opposite surface of said wall being subject to pressures in said pressure chamber whereby said wall will be moved into filtering position in response to the pressure in said chamber, and
   means to connect said pressure chamber to a source of pressurized fluid.

3. In cleaning apparatus,
   means forming a hydraulic circuit including a treatment zone and a liquid pump for circulating liquid through the circuit,
   a filter connected in said circuit on the discharge side of said liquid pump and including a flexible wall partitioning the interior of said filter into a pressure chamber and a filter chamber, said wall having a motive surface on one side responsive to pressure in said pressure chamber to form a pressure responsive member movable to a first positon, said wall forming together with said filter chamber a maze to remove foreign particles from the liquid at said first position and being movable to a second position to provide for flushing of the filter by the liquid, and means to connect said pressure chamber to a source of pressurized fluid to actuate said flexible wall.

4. In cleaning apparatus,
   means forming a hydraulic circuit including a treatment zone and a liquid pump for circulating liquid through the circuit, and
   a filter connected in said circuit to remove foreign particles entrained in the liquid,
      said filter comprising a filtering chamber having a pair of confronting surfaces and an inlet connected to the outlet of said liquid pump and an outlet to circulate the liquid through said filtering chamber between said surfaces,
      said surfaces being movable into engagement with one another to form a filter maze therebetween for trapping the entrained foreign particles and being movable away from one another wherein the trapped particles are released and the filter is flushed and cleaned by the liquid,
      said surfaces tending to move away from one another in response to the pressure of the liquid therebetween, and a fluid pressure chamber operatively connected to at least one of said surfaces to urge said surface into engagement with the other of said surfaces in response to pressurization of said chamber, and means to selectively pressurize said chamber for trapping foreign matter in the filter and then reducing the pressure for cleaning and flushing the filter.

5. In cleaning apparatus, means forming a hydraulic circuit including a treatment zone and a liquid pump for circulating liquid through the circuit, a filter connected in said circuit on the discharge side of said pump, said filter comprising, first and second rigid walls and a flexible wall therebetween partitioning the interior of the filter into first and second chambers, a liquid inlet and a liquid outlet in communication with said first chamber, said flexible wall and said first rigid wall having engageable confronting surfaces formed thereon and forming a filter maze for trapping foreign matter entrained in said liquid when engaged with one another, said flexible wall being movable away from said first rigid wall by the pressure of said liquid in said first chamber, a source of pressurized fluid connected to said second chamber to pressurize said second chamber for urging said flexible wall into filtering position, and means to release the fluid pressure in said second chamber whereby said flexible wall is moved out of filtering position and the filter is cleaned and flushed by the liquid.

6. In cleaning apparatus, means forming a hydraulic circuit including a treatment zone and a liquid pump for circulating liquid therethrough, means at one point in said circuit including a valve operative to selectively drain the liquid from said circuit, a filter at a second point in said circuit having a pressure responsive member movable in response to changes in a control pressure from a first position wherein said filter operates to remove foreign particles from the circuit to a second position wherein the filter is flushed by the liquid in the circuit, fluid actuating means for said movable member of said filter including a control pressure regulator for selectively controlling a supply of the control pressure from a source of fluid at increased pressure, and linking means between said regulator and said valve, whereby regulation of said filter will be co-ordinated with the operation of the valve.

7. In cleaning apparatus, means forming a hydraulic circuit including a treatment zone and a liquid pump for circulating liquid therethrough, means at one point in said circuit including a valve operative to selectively drain the liquid from said circuit, a filter at a second point in said circuit having a pressure responsive member movable in response to changes in a control pressure fluid from a first position wherein said filter operates to remove foreign particles from the circuit to a second position wherein the filter is flushed by the liquid in the circuit, and supply means connected to said filter to supply said pressurized control fluid to said movable member in said filter and including control means operative to selectively regulate the pressure of said fluid, said control means being operatively connected to said valve for co-ordinated operation of said control means and said valve.

8. In cleaning apparatus, means forming a hydraulic circuit including a treatment zone and a liquid pump for circulating liquid through said circuit, means at one point in said circuit including a valve selectively movable between a first position wherein the liquid is directed through said circuit and a second position wherein the liquid is directed from the circuit to a drain, a filter at a second point in said circuit having a pressure responsive member movable in response to changed in pressure of a pressurized control fluid between a first position wherein said filter operates to remove foreign particles from the circuit and a second position wherein the filter is flushed by the liquid in the circuit, supply means connected to said filter to supply said pressurized control fluid to said pressure responsive member, and control means connected to said supply means to regulate the supply of control fluid to said pressure responsive member and selectively movable between a first position wherein the fluid is directed to said pressure responsive member to move said member to said first position thereof and a second position wherein the fluid is directed away from said member to move said member to said second position thereof, and linkage means interconnecting said valve and said control means between their respective first and second positions in unison.

9. In cleaning apparatus, a treatment zone for confining laundry liquid therein, conduit means including a sump mounted at one point in said treatment zone, a discharge nozzle mounted at a second point in said treatment zone and a first conduit interconnecting said sump and said nozzle, a pump connected in said first conduit to circulate the liquid from said sump through said first conduit and to said nozzle to be discharged back to said treatment zone, a filter connected in said first conduit on the discharge side of said pump, said filter comprising a body having a pair of spaced first and second rigid walls and a flexible wall between said rigid walls partitioning said body into first and second chambers, said body having a liquid inlet and a liquid outlet connected in fluid communication with said first conduit and in fluid communication with each other through said first chamber, said first rigid wall and said flexible wall having confronting wall surfaces in said first chamber movable into engagement with one another to form a filter maze wherein foreign particles entrained in the liquid are trapped in said maze and movable away from one another wherein the trapped particles are released and the filter is cleaned and flushed by the liquid passing through said first chamber, said second chamber forming a pressure chamber to receive pressurized air wherein said flexible wall is urged into engagement with said first rigid wall in opposition to the pressure of the liquid in said first chamber, an air compressor, a second conduit interconnecting said air compressor and said second chamber, a check valve in said second conduit to enable air to move therethrough only from said compressor to said second chamber, a bleed valve mounted in said filter body and in communication with said second chamber, said bleed valve being selectively movable between a closed position whereby the compressed air is confined in said second chamber to raise the pressure of said second chamber and an open position whereby the air is exhausted from said second chamber to lower the pressure of said second chamber, a liquid valve connected in said first conduit downstream of said filter and selectively movable between a first position to direct liquid through said first conduit and a second position to direct liquid from said first conduit to a drain, and actuating means connected to said liquid valve and to said bleed valve to move said valves contemporaneously to their respective positions wherein said bleed valve is closed when said liquid valve is in its first position and said bleed valve is open when said liquid valve is in its second position.

References Cited
UNITED STATES PATENTS

| | | | |
|---|---|---|---|
| 3,179,116 | 4/1965 | Jacobs | 210—356 |
| 3,228,524 | 1/1966 | Richards | 210—108 X |
| 3,282,427 | 11/1966 | Mandarino et al. | 210—108 |

REUBEN FRIEDMAN, *Primary Examiner.*

D. REISS, *Assistant Examiner.*